(12) United States Patent
Ohlmeyer

(10) Patent No.: US 12,275,600 B2
(45) Date of Patent: Apr. 15, 2025

(54) PALLETIZER AND METHOD OF PALLETIZING PACKAGED GOODS

(71) Applicant: AVENTUS GMBH & CO. KG, Warendorf (DE)

(72) Inventor: Claus Ohlmeyer, Münster (DE)

(73) Assignee: AVENTUS GMBH & CO. KG, Warendorf (DE)

( * ) Notice: Subject to any disclaimer, the term of this patent is extended or adjusted under 35 U.S.C. 154(b) by 325 days.

(21) Appl. No.: 17/597,564

(22) PCT Filed: Jul. 9, 2020

(86) PCT No.: PCT/EP2020/069418
§ 371 (c)(1),
(2) Date: Jan. 11, 2022

(87) PCT Pub. No.: WO2021/009009
PCT Pub. Date: Jan. 21, 2021

(65) Prior Publication Data
US 2022/0258988 A1    Aug. 18, 2022

(30) Foreign Application Priority Data
Jul. 17, 2019   (DE) .......................... 102019119397.4

(51) Int. Cl.
*B65G 47/08*  (2006.01)
*B65G 47/244*  (2006.01)

(52) U.S. Cl.
CPC ......... *B65G 47/086* (2013.01); *B65G 47/244* (2013.01)

(58) Field of Classification Search
CPC ............................ B65G 47/086; B65G 47/244
USPC ......................................................... 198/374
See application file for complete search history.

(56) References Cited

U.S. PATENT DOCUMENTS

| | | | | |
|---|---|---|---|---|
| 5,139,388 A | * | 8/1992 | Martin ................. | B65G 57/245 414/922 |
| 6,264,422 B1 | * | 7/2001 | Hennes ................ | B65G 57/245 414/794.3 |
| 8,272,497 B2 | * | 9/2012 | Kaes .................... | B65G 47/086 198/377.07 |

(Continued)

FOREIGN PATENT DOCUMENTS

| DE | 102014105934 A1 | 10/2015 |
|---|---|---|
| DE | 102014223319 A1 | 5/2016 |
| DE | 102015210185 A1 | 12/2016 |

(Continued)

OTHER PUBLICATIONS

Top Tier LLD, WO2018064259, Heston (Year: 2018).*

(Continued)

*Primary Examiner* — Kavel Singh
*Assistant Examiner* — Lester Rushin, III
(74) *Attorney, Agent, or Firm* — Greer, Burns & Crain, Ltd

(57) ABSTRACT

A palletizer for palletizing packages, including a conveying device, which has a conveying element for conveying packages, and a stacking table. The conveying device includes three rotating devices for rotating the packages. In the method using such a palletizer, a predetermined number of packages are fed to the palletizer, a predefined number of packages are rotated by the rotating devices, and the packages are conveyed further and subsequently fed to the deposit table.

15 Claims, 4 Drawing Sheets

(56) References Cited

U.S. PATENT DOCUMENTS

| | | | | |
|---|---|---|---|---|
| 11,939,172 B2* | 3/2024 | Stollhof | ............... | B65G 47/907 |
| 2022/0258988 A1* | 8/2022 | Ohlmeyer | ............ | B65G 47/086 |

FOREIGN PATENT DOCUMENTS

| | | |
|---|---|---|
| DE | 102017215320 A1 | 3/2019 |
| EP | 2727689 A1 | 5/2014 |
| JP | H11322059 A | 11/1999 |
| WO | 2009019164 A1 | 2/2009 |
| WO | 2018064259 A1 | 4/2018 |

OTHER PUBLICATIONS

Kilibarda Velibor, WO201600220, Top Tier, LLD (Year: 2016).*
CN 210456624 (Year: 2020).*
DE 10 2014 223 319 A! (Year: 2016).*
De102015210185 (Year: 2016).*
DE102011080812 (Year: 2013).*
JP7302119 (Year: 2018).*
International Search Report and Written Opinion received for PCT/EP2020/069418, mailed Oct. 27, 2020.
German Search Report received for Application No. 10 2019 119 397.4, dated Jun. 4, 2020.
Newtech Bag Palletizing, Technical Data Sheets for Palletizer Series 1000, 1500, 1800, 2500B and 2500P, 2018, 10 pages.
Office Action and Search Report received for Chinese Application No. 202080051093.4, dated Sep. 28, 2023.
Communication received in European Application No. 20 749 812.2 dated Jun. 6, 2024.

* cited by examiner

PALLETIZER AND METHOD OF PALLETIZING PACKAGED GOODS

BACKGROUND

The present invention relates to a palletizer for palletizing packaged goods, in particular bags. A palletizer can in particular process filled, closed bags. The palletizer comprises at least one conveyor device including at least one conveying member for conveying packaged goods, and at least one stacking table. Moreover, the present invention relates to a method of palletizing packaged goods in particular using such a palletizer.

Packaged goods and in particular bags tend to be grouped to build specified packaging units, which are loaded and transported together. Then, for example bags tend to be stacked in several layers for example on pallets, on sheets, or palletless, subsequently, wrapped together as needed e.g. in plastic sheets for transport cover and/or transport safeguard, and thereafter, stored and/or transported.

The bags tend to be stacked by means of what is known as a palletizer. This palletizer serves for arranging a specific number of bags in what is known as a layer pattern, and thereafter transferring to a pallet. Thereafter, another layer is built and stacked onto the previous layer.

In relation to the configuration and stability requirements of the stacked bags, the layer patterns respectively the individual layers may be stacked in positions rotated respectively transverse to one another. Thus, jointless stacks tend to be built which are comparatively stable.

To this end, some of the palletizers known in the prior art comprise a bag rotating device so as to rotate the bags according to the layer pattern intended.

In the known palletizers, the bags tend to be conveyed and rotated on a conveyor belt, and then fed to what is known as a stacking table. This stacking table is then pulled off such that the layer pattern lying on the stacking table respectively the layer of bags disposed on the stacking table is deposited on, or transferred to, a pallet or sheets lying beneath, or deposited palletless.

For building up a classical 5-package layer pattern of two rows, the first row showing two bags in a longitudinal orientation and the second row, three bags in a transverse orientation, thus forming the layer pattern, these rows are as a rule built up separately and thereafter transferred to the stacking table one by one, or together.

For increasing palletizer output, the prior art has disclosed palletizers comprising two parallel conveyor sections so as to build the first and second layer pattern rows simultaneously respectively in parallel.

These palletizers operate reliably, depending on their configuration. A drawback of this configuration is, however, the increased, partly double structural input, reflected in the costs for acquisition, maintenance, and operation of the palletizer.

It is therefore the object of the present invention to provide a palletizer which offers high capacity while being more cost-effective.

SUMMARY

The palletizer according to the invention for palletizing packaged goods or packages, in particular for palletizing bags, comprises at least one conveyor device with at least one conveying member for conveying packages, and at least one stacking table. The conveyor device comprises at least three rotating devices for rotating the packages.

The palletizer according to the invention is in particular suited for palletizing packages with and/or without a pallet. The palletizer in particular builds at least one layer pattern of packages respectively bags, wherein the built-up layer pattern can be transferred from the stacking table for example onto a pallet. In stacking these layer patterns, the layer patterns of individual layers may be disposed rotationally offset to one another, to which end the layer pattern respectively the layer is then disposed on the stacking table preferably rotated.

Preferably at least one pallet or suitable stacking surface may be provided beneath this stacking table, wherein at least the stacking table is preferably disposed elevated. It is thus preferred for a lifting and lowering roller track or similar device for transporting pallets, sheets or palletless stacks of bags, to be disposed beneath the stacking table, wherein the pallet can in particular be lifted toward the stacking table. Then, depending on the configuration, after transferring a layer pattern from the stacking table, the pallet can be lowered some distance so as to always provide identical distances between the stacking table and the following supporting surface for transferring a layer.

For transferring the layer of packages respectively bags disposed on the stacking table onto a pallet or the like disposed beneath, the stacking table can in particular be displaced or moved, wherein the stacking table is for example pulled out from under the packages, such that the packages disposed on the stacking table drop onto a stacking surface beneath, such as for example a pallet or another layer of packages.

Preferably, the palletizer is preceded by at least one packaging machine, filling machine, packing machine or the like. Thus, in particular an upstream packaging machine can feed filled bags or packages to the palletizer.

The palletizer according to the invention is preferably followed downstream by at least one pallet transporter or the like and/or at least one packaging device, which serves to envelop or wrap pallets loaded with packages. Thus, for example stretch wrappers can be employed here.

As has been described above, in particular the stacking table and preferably the entire palletizer is disposed on a framework or the like, such that at least the stacking table is provided at such a height that a transport carriage with a pallet or the like can be disposed beneath the stacking table.

According to the invention the conveyor device comprises at least one conveying member and at least three rotating devices. The conveying member is preferably configured as a conveyor belt, band conveyor, roller conveyor or the like, on which packages can be conveyed. Furthermore, the conveyor device preferably also comprises at least one slider or the like, to convey or push off bags onto the stacking table, in the pattern according to a desired layer pattern built.

The at least three rotating devices or rotating stations may preferably be configured as separate assemblies, or in expedient specific embodiments they can be combined to form one joint assembly.

The palletizer according to the invention allows to build up any expedient types and layouts of layer patterns, such as groupings of 3, 4, 6, 7, 8, 9, 10, etc. In particular, the palletizer according to the invention can build the standard grouping of 5, wherein the layer pattern in particular consists of two rows. One of the rows comprises two packages respectively bags disposed in the longitudinal direction, and the second row, three packages respectively bags transverse to the bags of the other row.

The palletizer according to the invention offers many advantages. It is a considerable advantage that providing at least three rotating devices furnishes a structurally relatively simple palletizer, which enables a very high output.

Depending on the layer pattern, providing at least three rotating devices allows to carry out parallel rotations of the bags respectively the packages required for building layer patterns respectively rows of layer patterns. Thus, in particular in the case of groupings of 5, of two packages rotated longitudinally and three, rotated transversely, the bags concerned can be fed to the conveyor device respectively to the rotating devices in rows, while the bags are simultaneously rotated to assume the desired orientation.

Thus, the device achieves a very high output without providing two parallel conveyor sections, since the bags can in particular be rotated in rows in parallel respectively simultaneously.

Furthermore, it is preferably possible, depending on the layer pattern, to mix longitudinal and transverse bags, even within one row.

Preferably, at least one rotating device is configured as a clamping and rotating station. Preferably, all the rotating devices are configured as such a clamping and rotating station. In this clamping and rotating station, packages respectively bags are for example gripped and rotated with tongs-like grippers. Depending on the configuration, other mechanisms may be provided as a clamping and rotating device.

Alternately, a grid rotating device may be provided, which lifts the bag up from the conveying plane, rotates it to the predetermined position, and lowers it back down onto the conveying plane.

Particularly preferably, at least two, and in particular all, of the rotating devices are disposed adjacent. The rotating devices are in particular immediately adjacent to one another and/or they are even configured as one joint assembly.

Preferably, at least two rotating stations and in particular all of the rotating stations are disposed one after the other. The rotating stations are in particular disposed in series. Thus, the conveyor device can simultaneously feed a specific number of bags to the rotating stations.

In expedient specific embodiments, each of the rotating devices comprises at least one conveying member of its own. This configuration in particular allows to integrate a rotating device configured as a separate assembly. Depending on the configuration, a separate conveying member for each of the rotating devices may be provided if one single assembly having multiple rotating devices is used.

In particular given such a configuration, the following parameters can be adapted for optimizing the output: the rotational speed of the clamp, the conveying speed of the conveying members of the rotating devices, and/or their construction length.

Preferably, at least two rotating devices comprise one continuous conveying member. It is in particular preferred for all the rotating devices to comprise one shared, continuous conveying member, respectively for the rotating device to not comprise its own conveying member but to share the use of one conveying member of the conveyor device. Thus, it is in particular possible to convey bags by means of a conveying member respectively a conveyor belt, respectively the conveying member is conveying continuously, wherein during the conveying operation, the rotating devices grasp, optionally lift up, rotate, and place the packages respectively the bags.

Particularly preferably, at least two rotating devices rotate in different directions and/or set at least two different rotational angles. This is in particular understood to mean that at least two rotating devices can rotate both counterclockwise and also clockwise. Preferably, at least two rotating devices rotate in different directions. It is in particular preferred for these rotating devices to rotate in different directions in parallel respectively simultaneously. Thus, for example a bag infed in the longitudinal direction may be rotated 90° to assume an orientation transverse to the conveying direction. Depending on the configuration, a bag may also be rotated 270°, or 90° in the other direction. Rotating in different directions respectively different orientations of bags may become necessary in particular if a layer pattern is intended to show specific sides of the packages respectively of the bag for example on the outside. While this may in particular be for optical reasons, it may be necessary for identifying specific lettering on a package respectively bag, including within the layer pattern during the transport, such that for example lettering must always be visible from the outside. Thus, bags may have to be rotated differently, depending on the position in the layer pattern. Thus, it may in particular be preferred to convey one bag for example without rotation, and to rotate another bag 180°.

Preferably, at least one shaping device is provided. Such a shaping device is in particular provided, in the case of deformable respectively non-rigid or not completely rigid packages, to achieve a better layer pattern respectively better stackability. The shaping device is in particular configured as a pressing and smoothing belt, vibration smoothing belt or the like. In particular in the case of stacking respectively palletizing bags or the like, such a shaping device can be employed advantageously. Such a shaping device is in particular integrated in the conveyor device, and in particular disposed upstream of the rotating devices.

In expedient specific embodiments, at least one infeed is provided. Such an infeed serves in particular as a connection with a packaging system upstream of the palletizer, depending on the configuration. The packages intended for palletizing are fed to the palletizer via such an infeed.

Particularly preferably, the infeed provides at least one infeed buffer. Such an infeed buffer allows controlling the feeding of packages to the palletizer. Thus, for example by way of the length of the infeed respectively infeed belt, and by way of the infeeding speed, a coordinated, controlled feed of packages to the palletizer is enabled. To this end, for example gravity rollers may be provided, defining a specific conveying speed of the infeed buffer.

Preferably, at least one elevated infeed situation is provided. As has been set forth above, it is in particular preferred for the entire palletizer to be elevated respectively disposed on a framework or the like.

In expedient specific embodiments, at least one collection conveyor is disposed downstream of the rotating stations. This collection conveyor can preferably operate indexed. Thus, it is in particular conceivable for the packages respectively the bags to be collected in rows on the collection conveyor, to then be transferred to a stacking table. Depending on the configuration, the collection conveyor may preferably also be provided by way of the conveying member of the conveyor device, respectively may be integrated in a shared conveying member respectively a shared conveyor belt.

Preferably, at least one sliding device is attributed to the stacking table. Depending on the configuration, a twin slider and/or single slider and/or multiple slider may be provided. Thus, it may in particular be provided for a row to be temporarily pushed off to a temporary table, wherein thereafter, the layer pattern is completely pushed off onto the stacking table. Alternately, the packages respectively bags can be pushed off onto the stacking table temporarily or in rows.

Preferably, at least one frame structure is provided for elevated mounting of the device. Such a frame structure, for example of a framework type, allows an elevated arrangement of the palletizer.

Preferably, at least one control cabinet is provided which may, though does not have to, be integrated in the frame device. Integrating a control cabinet in the frame structure can on the one hand achieve a space-saving accommodation of the control cabinet within the frame structure. Thus, this control cabinet preferably does not protrude outwardly. Depending on the configuration, the control cabinet can furthermore be provided as an assembly with the frame structure or part of the frame structure, so as to allow preinstallation, which offers advantages in particular when installing the palletizer on site at the customer's.

Preferably, the palletizer is modular in structure. It is in particular preferred to provide individual palletizer sections as standard assemblies. Thus, in particular the infeed, the conveyor device, the rotating devices, the slider and/or the stacking table may be provided as standard assemblies, separately or connected with adjacent assemblies. The particular advantage of such a configuration is the option of separately preinstalling and testing these assemblies. Since standard assemblies and assembly connections are provided, so as to only require plugging in for installing the system, there is no need for complex testing of the entire system.

The method according to the invention is suitable for palletizing packages, in particular bags, in particular by means of a palletizer as described above. For building a predetermined layer pattern, the following steps are carried out in a suitable sequence. A predetermined quantity of packages is fed to the rotating devices by means of the conveying member of the conveyor device. At least one package is rotated to a predetermined orientation. The package or the packaged goods are conveyed further and pushed onto the stacking table respectively fed to the stacking table.

The steps described above are preferably carried out row by row, depending on the layer pattern to be built, respectively depending on the number of rows comprised in the layer pattern. Thus, for example in the case of a classical grouping of 5 with two longitudinally oriented packages respectively bags and three transversely oriented bags, firstly the packages required for the first row are fed to the palletizer, suitably rotated as needed, and conveyed further. Thereafter, the second row respectively the packages forming the second row, are fed to the palletizer, suitably rotated as needed, and conveyed further. Depending on the configuration, the rows are temporarily pushed off one by one onto the stacking table, or the first row is positioned temporarily, and thereafter pushed onto the stacking table together with the second row.

As soon as the layer pattern is disposed on the stacking table, the stacking table is preferably pulled off respectively displaced, such that the layer pattern is transferred to a stacking surface positioned beneath, in particular a pallet.

The method according to the invention for palletizing packages also shows the advantages indicated above regarding the palletizer according to the invention.

Preferably, at least one rotating device is configured as a clamping and rotating station. Configuring the rotating devices as a clamping and rotating station allows to grab a bag respectively package, optionally lift it, rotate it to a desired orientation, and optionally put back down thereafter.

Particularly preferably, at least two packages respectively bags are rotated substantially simultaneously. In particular all the packages respectively bags of one row of a layer pattern are rotated simultaneously, in the case that all of these bags require rotation.

In expedient specific embodiments, the packages are processed in rows. Firstly, the first row of a layer pattern is fed to the rotating devices, rotated, and conveyed further. Thereafter, the second row respectively each further required row of a layer pattern is processed, or further bags of a row are processed, if more than three bags are provided in one row. Depending on the configuration, each of the rows can be pushed respectively transferred to the stacking table separately or together.

In advantageous configurations, at least two packages respectively bags are rotated in different directions and/or different rotational angles. For example in the case of longitudinally infed bags, a transverse bag orientation may be provided, with the two bags positioned transverse to the conveying direction but in opposite orientations. Thus, for example lettering may be provided on a side of the bag which is intended to show in the layer pattern, on the left for one bag, and on the right for the other bag. This can be achieved on the one hand, by rotating one bag 90° in one direction and the other bag, 270° and in the same direction. Alternately, one bag may be rotated 90° in one, and the other bag, 90° in the other direction.

In all the configurations described above, processing the bags for a layer pattern is preferably provided row by row. Then, depending on the configuration, the bags of a row are processed at the same time, e.g. rotated and then conveyed further. Alternately, the rotating devices may process the bags continuously, independently of the rows. For example if a rotating station is idle during a row change, the first bag of the next row can already be processed, such that none of the rotating stations is idle at any time. This is another option of optimizing the output, depending on the configuration. The rows are then preferably built downstream of the rotating stations on the collection conveyor.

Preferably, the conveyor device, for example a conveyor belt, is stopped while the rotating devices are processing the bags. After processing the bags, the conveyor belt is then started again. Alternately, expedient configurations may be provided with a continuously running conveyor device, wherein the bags are processed and in particular rotated while passing through the rotating devices. This also allows to optimize the output.

BRIEF DESCRIPTION OF THE DRAWINGS

Further advantages and features of the present invention can be taken from the exemplary embodiment which will be described below with reference to the enclosed figures.

The figures show in.

DETAILED DESCRIPTION

Figure 1:
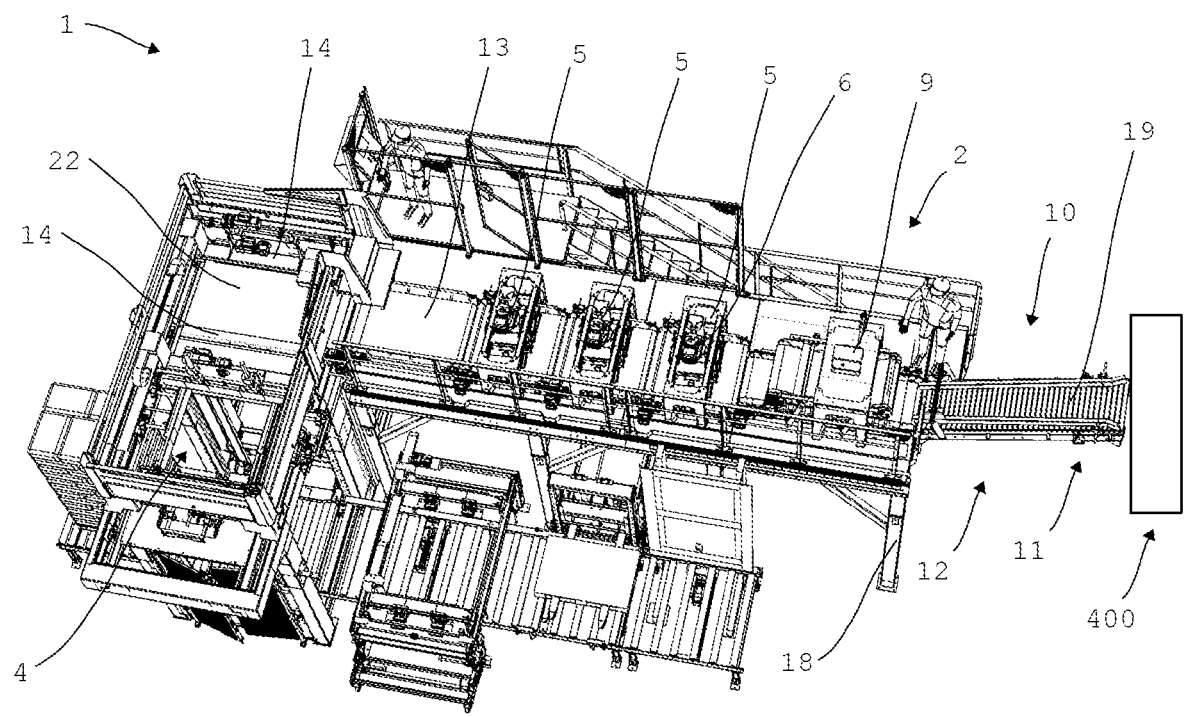
FIG. 1 a schematic illustration of an exemplary embodiment of a palletizer according to the invention in a perspective view.
Figure 2:
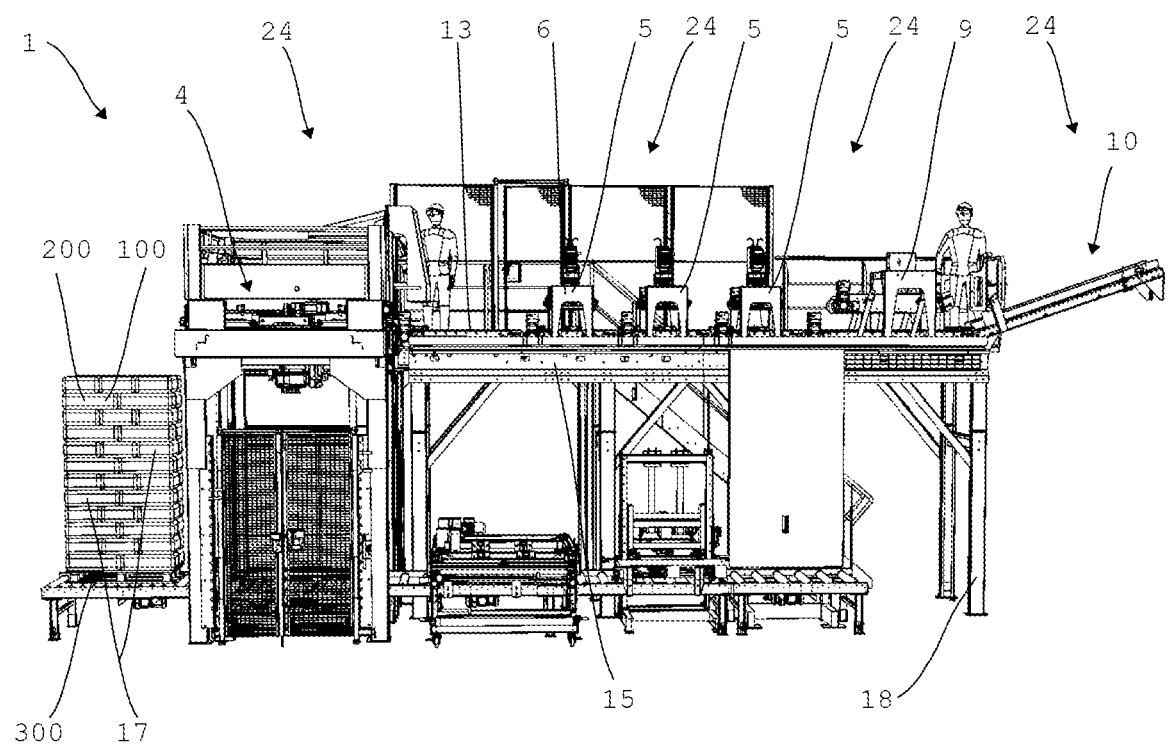
FIG. 2 a schematic illustration of an exemplary embodiment of a palletizer according to the invention in a side view.
Figure 3:
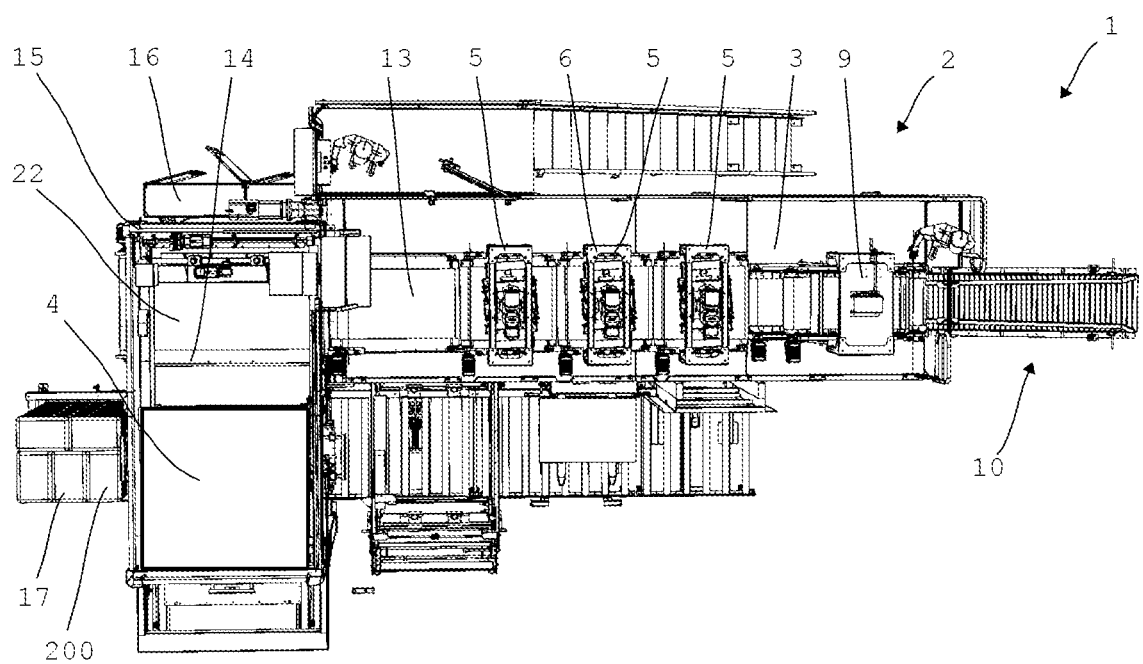
FIG. 3 a schematic illustration of the conveyor device of an exemplary embodiment of a palletizer according to the invention in a plan view.
Figure 4:
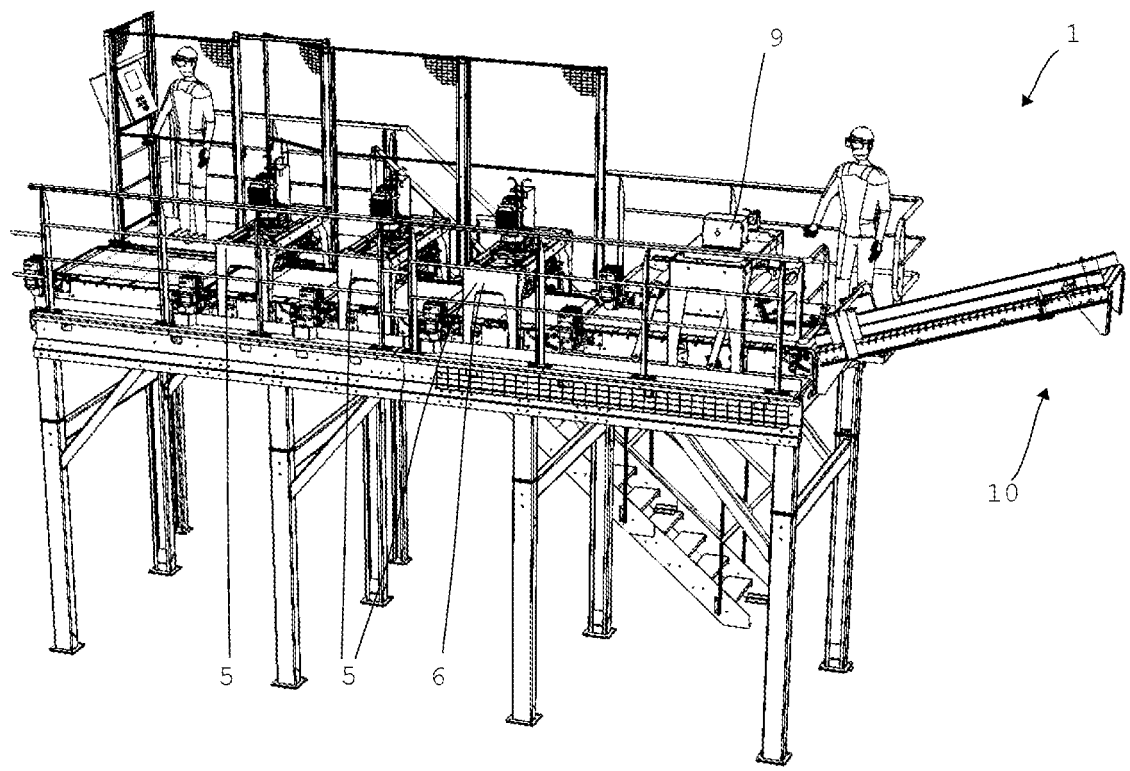
FIG. 4 a schematic illustration of an exemplary embodiment of a palletizer according to the invention in another perspective view.
Figure 5:
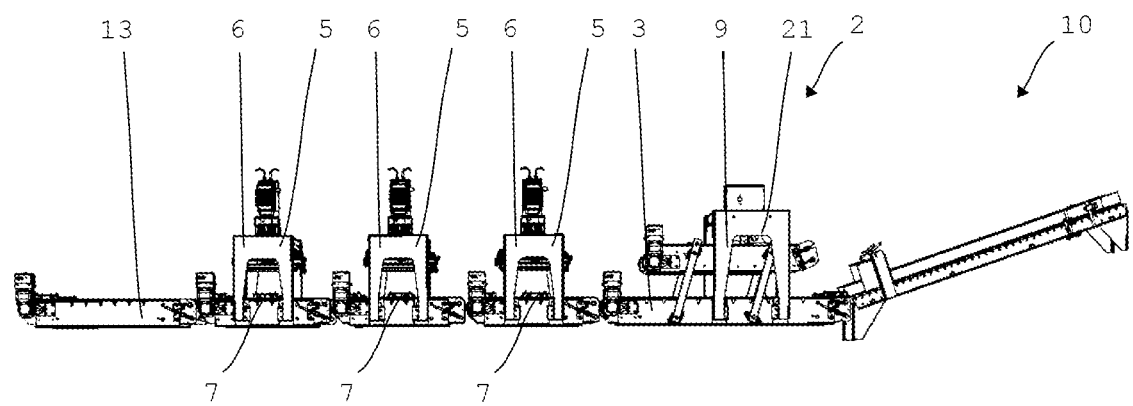
FIG. 5 a schematic illustration of the conveyor device of an exemplary embodiment of a palletizer according to the invention in a side view.
Figure 6:
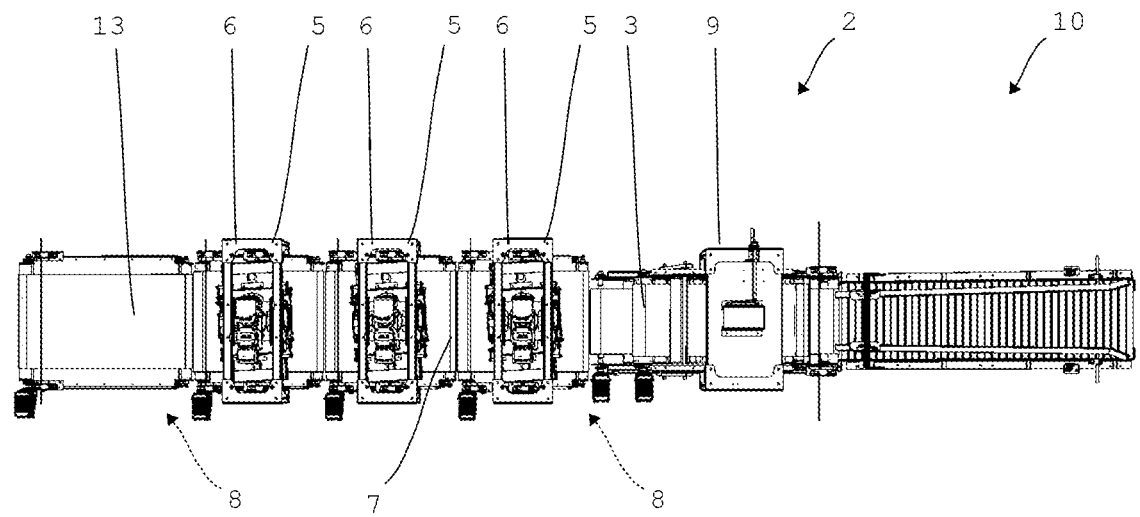
FIG. 6 a schematic illustration of the conveyor device of an exemplary embodiment of a palletizer according to the invention in a plan view.
Figure 7:
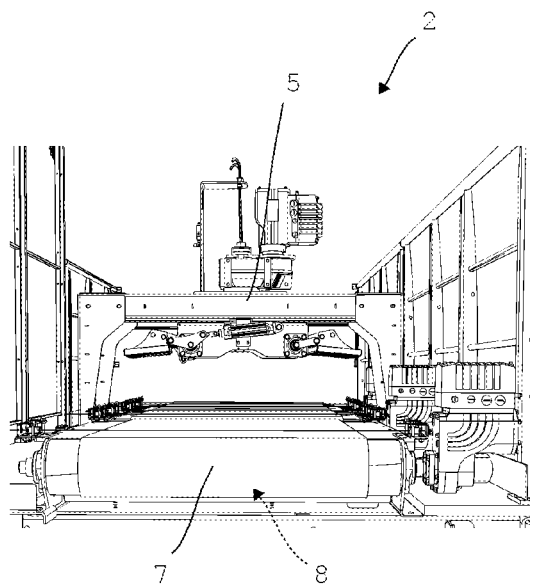
FIG. 7 a schematic illustration looking into the conveyor device of an exemplary embodiment of a palletizer according to the invention in a perspective view.
Figure 8:
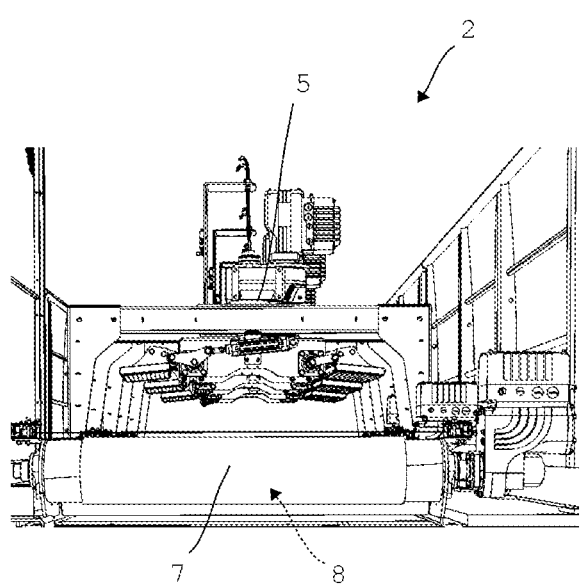
FIG. 8 a schematic illustration looking into the conveyor device of an exemplary embodiment of a palletizer according to the invention in another perspective view.

The FIGS. 1 bis 4 are schematic illustrations of different views of an exemplary embodiment of a palletizer 1 according to the invention.

The palletizer 1 according to the invention is in particular suitable for disposing packages 100, and in the exemplary embodiment shown, bags 200, in a predetermined layer pattern 17, and to transfer these to a pallet 300, a sheet, or palletless.

In the exemplary embodiment shown, a packaging system 400 indicated just schematically, fills and closes bags, and then feeds them to the palletizer 1 via an infeed 10.

The exemplary embodiment shown is provided with an elevated infeed situation 12, wherein in this instance, the entire palletizer 1 is elevated. To this end, the components required for building a layer pattern 17 of bags 200, are disposed elevated on a framework 18.

In the exemplary embodiment shown, the infeed 10 comprises an infeed buffer 11, such that by utilizing the length of the infeed 10 and the transporting speed of the infeed 10, packages 100 respectively bags 200 can be fed to the palletizer 1 continuously and steadily. The infeed buffer 11 in the exemplary embodiment shown comprises multiple gravity rollers 19.

Following the infeed 10, the bags 200 are fed to a conveyor device 2, which in the exemplary embodiment shown has a conveying member 3, which in this case is a conveyor belt 20.

This conveyor belt 20 firstly feeds the bags 200 intended for palletizing to a shaping device 9, which is presently configured as a pressing and smoothing belt 21. In this optional shaping device 9, in particular packages 100 showing non-stable forms, such as filled bags 200, are processed so as to obtain even contours and plane surfaces as far as possible. This will achieve a particularly uniform layer pattern 17, such that the packages 100 respectively the bags 200 can build particularly stable stacks.

Furthermore, the conveyor device 2 in the exemplary embodiment shown comprises three rotating devices 5, all of which are configured as clamping and rotating stations 6 in the exemplary embodiment shown. Each of these rotating devices 5 can receive one fed bag 200, which can then be gripped and rotated as required. Thus, packages 100 respectively bags 200 can be arranged on the conveyor device 2 in a desired layer pattern 17. In the exemplary embodiment shown, the layer pattern 17 is prepared in two rows 23, row by row.

In the exemplary embodiment shown, the rotating devices 5 are followed downstream by a collection conveyor 13, by way of which the bags 200 positioned in the desired orientation are conveyed row by row in the direction of a stacking table 4.

In the exemplary embodiment shown, the bags 200 suitably oriented for a layer pattern 17 respectively each of the rows 23 for a layer pattern 17, are firstly fed to a temporary table 22. Furthermore, a sliding device 14 is provided which first pushes the first layer 23 into an intermediate position and thereafter feeds the entire layer pattern 17, i.e. both of the rows 23, to the stacking table 4.

This allows for example to lay a grouping of 5, providing two bags 200 in a longitudinal orientation and three bags 200, in a transverse orientation. Then, a first row of the layer pattern 17 is oriented by means of the rotating devices 5, and thereafter transported to the temporary table 22 by means of the collection conveyor 13, wherein they are first displaced to an intermediate position by the sliding device 14. Thereafter, the completed layer pattern 17 respectively the complete layer of bags 200 is fed to the stacking table 4 by means of the sliding device 14.

In other configurations, each of the rows 23 can be fed to the stacking table 4 separately, thus they are joined to form a complete layer pattern 17 only on the stacking table 4.

Depending on the configuration, the sliding device may comprise one or more sliders. A twin slider or a multiple slider may in particular be provided.

Thereafter, the stacking table 4 can be displaced respectively pulled off, such that the layer of bags 200 is deposited on, respectively transferred to, a pallet 300 disposed beneath. The Figures show the stacking table 4 in the retracted position, in which the passage to the pallet 300 is clear.

Since the palletizer 1 is provided in an elevated structure, a pallet 300 may be disposed beneath the stacking table 4, wherein the pallet 300 may be provided relatively closely beneath the stacking table 4, for example by means of a dedicated system, for example including a lifting and lowering roller track. After transferring a layer of bags 200 to the pallet 300, the pallet 300 with the bags 200 can then be displaced further downwardly, such that the next layer of bags 200 will show the same distance from the stacking table 4.

Alternatingly, e.g. in a grouping of 5, the layers are first built twice lengthwise and three times transverse, and in the next layer, first three times transverse and twice lengthwise, to obtain a joggled layer pattern, which will contribute to an increased stacking and thus transporting stability. Alternately, following each identically built layer, the stacking surface respectively pallet may be rotated 180° to obtain the joggled layer pattern.

In the exemplary embodiment shown, the palletizer 1 according to the invention is provided modular, to which end a frame structure 15 is provided.

In the exemplary embodiment shown, this frame structure 15 also comprises the framework 18. Providing a modular palletizer 1, the exemplary embodiment shown provides separate standard assemblies 24, which for final assembly only require connecting by standard connections. Thus, these assemblies 24 can be tested separately, independently of the entire grouping of the palletizer 1.

It is in particular possible for example to integrate a control cabinet 16 in, respectively fixedly connect it with, the frame structure 15, as is the case in the example shown. Such a control cabinet can be preinstalled, such that the final assembly only requires plugging in a few, preferably standard, plug-in type connections, to complete the final assembly of the apparatus 1.

The FIGS. 5 to 8 illustrate in a side view, a plan view, and two different perspective views, the conveyor device 2 with the three rotating devices 5.

It can be seen that the rotating devices 5 are disposed adjacent to one another and in series. Thus it is possible for example when building a row 23 of a layer pattern 17 with three bags 200, to feed three bags concurrently to one rotating device 5 each. Then, the three bags 200 can be brought to the desired orientation in parallel respectively simultaneously.

It is provided for the rotating devices 5 to orient the bags 200 in different directions respectively at different rotational angles. For example if the bags are fed in the longitudinal direction, and an orientation of the bags in the transverse direction is provided, for example all the bags can be rotated 90° to the left.

Depending on the configuration, it may be required to dispose the bags rotated in different directions, for example in the case of lettering provided on one side of the bag 200, which is intended to show in the layer pattern 17 in a specific position for each bag. Then, for example a bag 200 can be rotated 90° to the left, wherein another bag 200 is rotated 90° to the right. The same result can be achieved by rotating both of the rotating devices 5 in the same direction, wherein one bag is rotated 90° and the other bag, 270°.

Depending on the configuration, the rotating devices 5, presently configured as a clamping and rotating station 6, may be provided as separate assemblies, or may be provided as one joined assembly.

Each of these rotating devices 5 may have its own conveying member 7, wherein in the exemplary embodiment shown, bags fed to the palletizer 1 via the infeed 10 are fed to the rotating devices 5 via the conveying member 3 of the conveyor device 2. The bags 200 are then conveyed further to the collection conveyor 13 via the conveying members 7 of the rotating devices 5.

In a configuration not shown in detail, a shared, continuous conveying member 8 may be provided to replace the conveying member 3, the conveying members 7 of the rotating devices 5, and preferably also the collection conveyor 13. Given such a configuration, the bags are fed to the rotating devices 5 by means of this shared conveying member 8, wherein the shared conveying member 8 can then also operate continuously, wherein the rotating devices 5 grip and rotate during the transport, the bags 200 fed by way of the conveying member 8.

Figure 9:
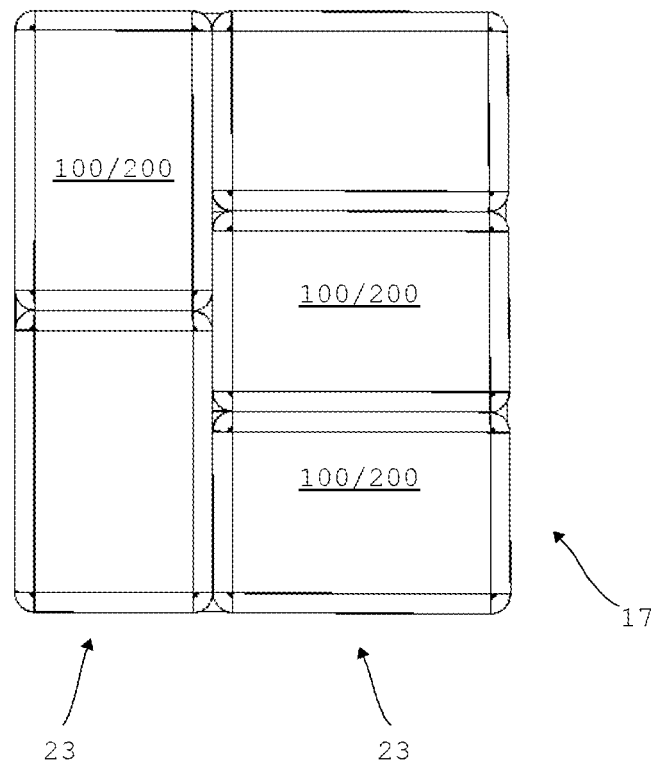
FIG. 9 a schematic illustration of a layer pattern built by an exemplary embodiment of a palletizer according to the invention.

FIG. 9 schematically illustrates a layer pattern 17 of packages 100 respectively bags 200, presently showing a grouping of 5. Two bags 200 are disposed in the longitudinal direction, and three bags 200, in the transverse direction, in two rows 23 as a layer pattern 17.

Such a layer pattern 17 respectively such a layer of bags 200 is fed to the stacking table 4 and then transferred to a pallet 300. The next layer pattern 17 respectively the next layer of bags 200 can then be fed to the stacking table rotated for example 90° or, depending on the configuration, 180°. Layers stacked upon one another at an offset provide for particularly stable stacks.

While particular embodiments of the present palletizer and method of palletizing packaged goods have been described herein, it will be appreciated by those skilled in the art that changes and modifications may be made thereto without departing from the invention in its broader aspects and as set forth in the following claims.

LIST OF REFERENCE NUMERALS 1 palletizer
2 conveyor device
3 conveying member
4 stacking table
5 rotating device
6 clamping and rotating station
7 conveying member
8 continuous conveying member
9 shaping device
10 infeed
11 infeed buffer
12 infeed situation
13 collection conveyor
14 sliding device
15 frame structure
16 control cabinet
17 layer pattern
18 framework
19 gravity roller
20 conveyor belt
21 pressing and smoothing belt
22 temporary table
23 row
24 assembly
100 packaged goods, package
200 bag
300 pallet
400 packaging system

The invention claimed is:

1. A palletizer for palletizing packages, in particular bags, comprising: at least one conveyor device with at least one conveying member for conveying packages; and at least one stacking table;
   the conveyor device comprises at least three rotating devices for rotating the packages, wherein the rotating devices are disposed one after the other, wherein each of the rotating devices is provided with at least one associated conveying member, and wherein the rotating devices are all configured as clamping and rotating stations;
   at least one collection conveyor is disposed downstream of all of the rotating stations;
   at least one sliding device is attributed to the stacking table; and
   a temporary table is disposed downstream of the collection conveyor.

2. The palletizer according to claim 1, wherein the rotating stations are disposed adjacent.

3. The palletizer according to claim 1, wherein at least two rotating devices rotate in different directions.

4. The palletizer according to claim 1, wherein at least two rotating devices set different rotational angles.

5. The palletizer according to claim 1, wherein at least one shaping device is provided.

6. The palletizer according to claim 1, wherein at least one infeed is provided.

7. The palletizer according to claim 6, wherein the infeed provides at least one infeed buffer.

8. The palletizer according to claim 1, wherein an elevated infeed situation is provided.

9. The palletizer according to claim 1, wherein at least one frame structure is provided for elevated mounting of the palletizer.

10. The palletizer according to claim 9, wherein at least one control cabinet is provided which is integrated in the frame structure.

11. The palletizer according to claim 1, wherein the palletizer is modular in structure.

12. A method for palletizing packages, in particular bags, by means of a palletizer according to claim 1, wherein for building a predetermined layer pattern the following steps are carried out in a suitable sequence:
feeding a predetermined quantity of packages by means of the conveying member of the conveyor device to the rotating devices;
rotating at least one package from the predetermined quantity of packages to a predetermined orientation;
conveying the packages further; and
displacing the packages on the stacking table.

13. The method according to claim 12, wherein at least two packages are rotated substantially simultaneously.

14. The method according to claim 12, wherein the packages are processed in rows.

15. The method according to claim 13, wherein at least two packages are rotated in different directions and/or wherein different rotational angles are used.

* * * * *